US006269162B1

(12) United States Patent
McMillan

(10) Patent No.: US 6,269,162 B1
(45) Date of Patent: Jul. 31, 2001

(54) TELECOMMUNICATIONS CROSS-CONNECT ASSEMBLY WITH COMBINED CONNECTOR/TRANSFORMER

(75) Inventor: William F. McMillan, Spokane, WA (US)

(73) Assignee: Telect, Inc., Liberty Lake, WA (US)

( * ) Notice: Subject to any disclaimer, the term of this patent is extended or adjusted under 35 U.S.C. 154(b) by 0 days.

(21) Appl. No.: 09/326,136

(22) Filed: Jun. 4, 1999

(51) Int. Cl.[7] .............................. H04M 1/00; H01R 13/66
(52) U.S. Cl. .............................................. 379/438; 439/620
(58) Field of Search ..................................... 379/438, 399; 439/578, 218, 620; 324/637

(56) References Cited

U.S. PATENT DOCUMENTS

| | | | |
|---|---|---|---|
| 3,530,425 | 9/1970 | Vachhani | 339/95 |
| 3,739,076 | 6/1973 | Schwartz | 174/78 |
| 4,126,372 | 11/1978 | Hashimoto et al. | 339/177 E |
| 4,770,639 | 9/1988 | Lau | 439/61 |
| 4,784,609 | 11/1988 | Lau | 439/56 |
| 4,840,568 | 6/1989 | Burroughs et al. | 439/49 |
| 4,975,087 | 12/1990 | Williams et al. | 439/668 |
| 5,044,990 | 9/1991 | Knotts | 439/578 |
| 5,108,300 | 4/1992 | Weber | 439/188 |
| 5,137,469 * | 8/1992 | Carpenter et al. | 439/578 |
| 5,157,338 * | 10/1992 | Motherbaugh et al. | 324/637 |
| 5,284,449 | 2/1994 | Vaccaro | 439/583 |
| 5,326,280 | 7/1994 | Briones et al. | 439/581 |
| 5,439,395 | 8/1995 | Laukzemis | 439/668 |
| 5,857,866 | 1/1999 | Felps | 439/289 |
| 5,879,166 | 3/1999 | Wang | 439/63 |
| 5,888,094 | 3/1999 | Kubota et al. | 439/583 |

* cited by examiner

*Primary Examiner*—Jack Chiang
(74) *Attorney, Agent, or Firm*—Wells, St. John, Roberts, Gregory & Matkin, P.S.

(57) ABSTRACT

Disclosed is an electrical connector assembly wherein an electrical signal transformer is mounted to or within the electrical connector assembly. The electrical connector assembly is mounted to a printed circuit board utilized in a telecommunication network digital cross-connect module. The electrical connector assembly is preferably a BNC, a TNC type or a 1.6/5.6 of electrical connector.

10 Claims, 7 Drawing Sheets

TELECOMMUNICATIONS CROSS-CONNECT ASSEMBLY WITH COMBINED CONNECTOR/TRANSFORMER

TECHNICAL FIELD

This invention pertains to a telecommunications cross-connect assembly which utilizes a combined electrical connector and transformer, the preferred electrical connectors being a BNC type connector, a TNC type connector or a 1.6/5.6 type connector. The transformer is mounted to or within the electrical connector housing, and the combination provides one set of contacts which is electrically connected to a circuit board.

BACKGROUND OF THE INVENTION

Numerous types of electrical connectors have been used for many years to provide an attachable and detachable electrical connection between electrical devices. A common type of electrical connector is a Bayonet Neil-Concelman ("BNC") connector, which was developed many years ago. The BNC electrical connector is very common in the telecommunications industries for connecting cables having two conductors therein; i.e., coaxial cables, for various applications. There is a similar electrical connector, referred to as a Threaded Neil-Concelman ("TNC") connector, which is very similar to the BNC, with the main difference being that there are threads in the TNC instead of the bayonet feature. There is at least a third well-known connector with which this invention may be applied, and that is a 1.6/5.6 connector.

A typical BNC connector includes a male connector assembly and a female connector assembly which are designed and adapted to be engaged and disengaged with one another. These connectors are typically referred to as two conductor connectors: the first conductor being a center conductor which would electrically connect or mate with a female receptacle; and the second conductor being a center terminal which would electrically connect or mate with a corresponding sleeve, as described in U.S. Pat. No. 5,857,866, which is incorporated herein by reference. Oftentimes but not necessarily, the second conductor (which is typically the center terminal and sleeve), is a ground.

The sleeve of the female connector assembly surrounds the female receptacle and includes a pair of diametrically opposed engagement pins which extend radially outward from the sleeve. The male connector assembly includes a male BNC center terminal having a center conductor. The male connector assembly also includes a locking collar having a pair of slots that are adapted to engage the engagement pins on the sleeve of the female connector to lock the connectors together.

The female and male connectors can be connected and locked together by first engaging the male BNC center terminal with the sleeve and then rotating the locking collar to the locked position. This coupling action is a twist-lock feature of the BNC connector and allows a reliable electrical connection to be made without the danger of the connection later being accidentally or gradually lost.

As is known in the industry, in the TNC connector, the external threads on the male connector component mate with the internal threads in the female connector component, and replace the twist-lock feature of the BNC.

In the telecommunications industry there are many different applications for BNC connectors. A common application relative to this invention is the use of the BNC electrical connector as used in a digital cross-connect module. One example of such a module is that disclosed in U.S. Pat. No. 4,975,087 dated Dec. 4, 1990, which is hereby incorporated by reference into this specification.

There are different options for connections on the rearward side of a cross-connect module, and the option relevant to this invention is the use of BNC coaxial connectors to attach cross-connect modules and cross connect panels (to which cross connect jack assemblies are attached) to other equipment.

An electrical signal passing through a BNC electrical connector on the rearward side of a cross-connect module will typically need to be transformed by passing through a transformer. In order to transform the electrical signal and utilize BNC electrical connectors, a transformer is typically mounted on a printed circuit board and is between the BNC connector and the switch assemblies in the cross-connect module. The circuit board will typically include multiple transformers, one for each of the multiple BNC connectors, as illustrated in FIGS. 4A & 4B.

The process of individually mounting each transformer and each BNC connector to the printed circuit board separately is more laborious, time consuming and expensive than is necessary.

This invention substantially reduces the assembly time and reliability by providing a BNC connector which includes a transformer mounted to or within the BNC connector housing. The combined assembly can then be mounted on a circuit board with one set of contacts being electrically connected to the circuit board, improving reliability and saving time and money.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Many of the fastening, connection, manufacturing and other means and components utilized in this invention are widely known and used in the field of the invention described, their exact nature or type is not necessary for an understanding and use of the invention by a person skilled in the art or science, and they will not therefore be discussed in significant detail. Furthermore, the various components shown or described herein for any specific application of this invention can be varied or altered as anticipated by this invention, and the practice of a specific application of any element may already be widely known or used in the art or by persons skilled in the art or science, and each will not therefore be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such but instead mean "at least one".

The acronym "BNC" is well known in the industry as identifying a specific type of electrical connection or connector, namely a Bayonet Neil-Concelman ("BNC") connector. BNC connectors were developed many years ago and are typically used to connect coaxial cables which are two-conductor cables. The "B" stands for bayonet type of connection, and there is also a TNC connection which is, instead of a bayonet connection, a threaded connection. When the term "BNC" is used herein or in the claims, it shall also be construed to include a TNC connection.

Figure 1:
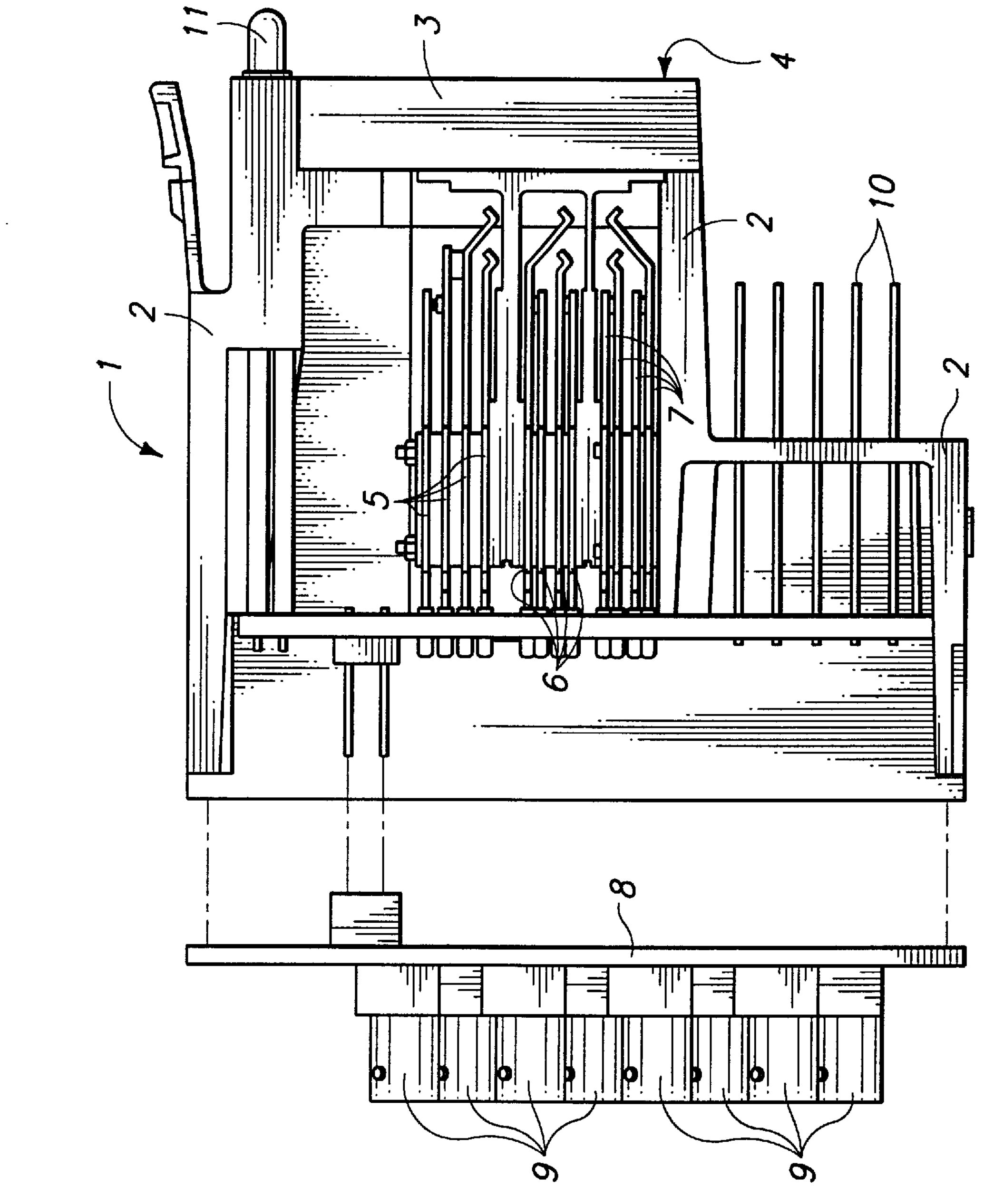
FIG. 1 is a side view of a DSX-1 cross-connect telecommunications jack assembly.

Referring to the drawings, FIG. 1 is an exploded side view of a typical DSX cross-connect telecommunications jack assembly, which is similar to those disclosed and described in the jack assembly module disclosed in U.S. Pat. No. 4,975,087 (which is incorporated herein by reference), in a module frame work. While one embodiment of this invention contemplates jack assemblies in a module, other embodiments also contemplate a plurality of individual jack assemblies connected to a rear printed circuit board panel.

Cross-connect jack assembly 1 includes framework 2, front panel 3, front surface 4 to front panel 3, monitor switch assembly 5, output switch assembly 6, input switch assembly 7, pin connectors 10 and LED display 11. FIG. 1 also illustrates a rearward printed circuit board 8, with BNC type electrical connector assemblies 9 mounted thereon. Item 8 may be representative of a circuit board panel to which many jack assemblies may be attached, or it may represent a circuit board for one individual module, such as a four jack module, depending on the embodiment of the invention. As is well known, the printed circuit board has conductive traces imparted thereon for carrying electrical signals as desired.

Figure 2:
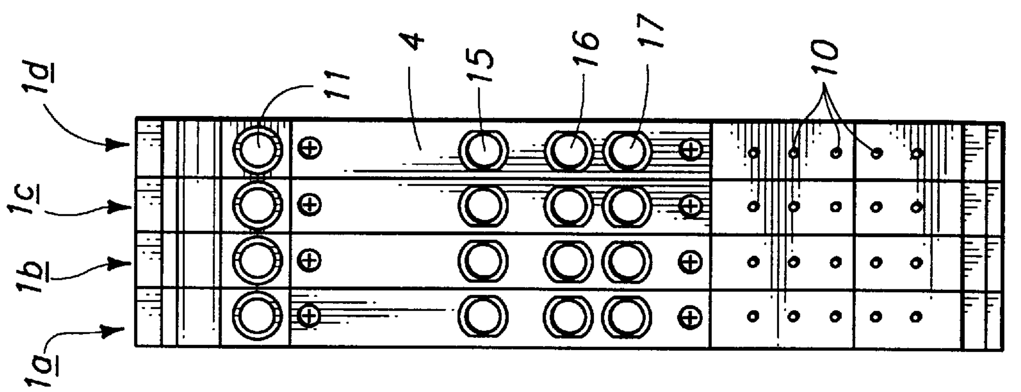
FIG. 2 is a front view of a DSX-1 cross-connect telecommunications jack assemblies held side by side in a module.

FIG. 2 is a front view of the telecommunications cross-connect jack assemblies 1*a*, 1*b*, 1*c* and 1*d*, held together side by side to form a module, and illustrates the front surface 4 of front panels 3, monitor aperture 15, output aperture 16 and input aperture 17. Plugs are inserted through the monitor aperture 15, the output aperture 16 and/or the input aperture 17, to make electrical contact with the respective switch assemblies. Also shown are LED displays 11 and pin connectors 10.

Figure 3:
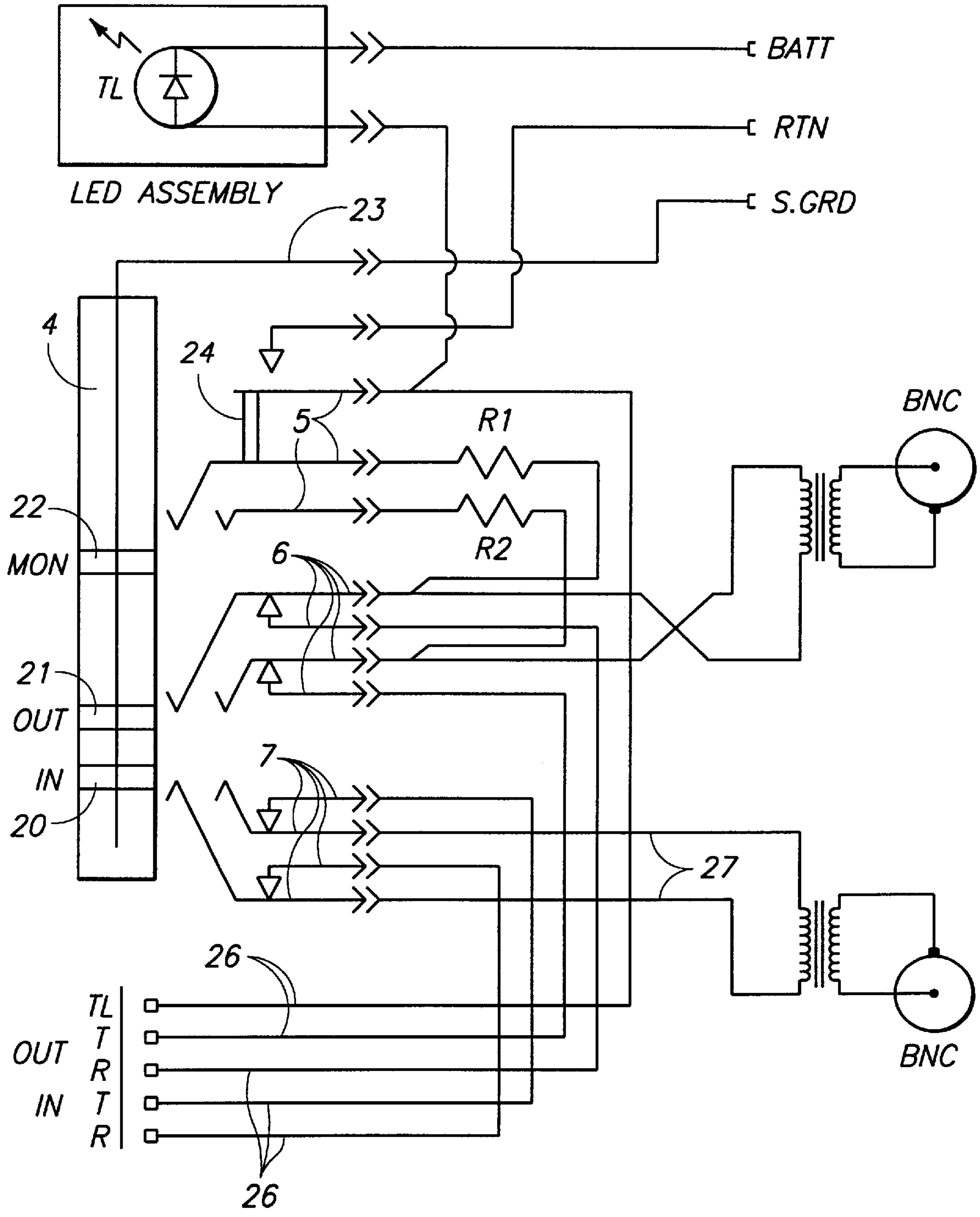
FIG. 3 is an exemplary electrical schematic representation of a jack assembly.

FIG. 3 is an exemplary electrical schematic representation of a jack assembly within the cross-connect assembly 1. Apertures in the front panel 4 are depicted as sleeves 20, 21 and 22. Switch assemblies 5, 6 & 7 are schematically depicted, as is ground terminal 23. Switch assembly spacer 24 is also schematically depicted within switch assembly 5.

FIG. 3 also schematically depicts the terminal pins or connector pins for the front cross-connect module. Schematic lines 26 illustrate terminal pins 26 and schematic lines 27 the lines to output electrical connectors. A specific electrical scheme is not necessary to practice this invention.

Figure 4A:
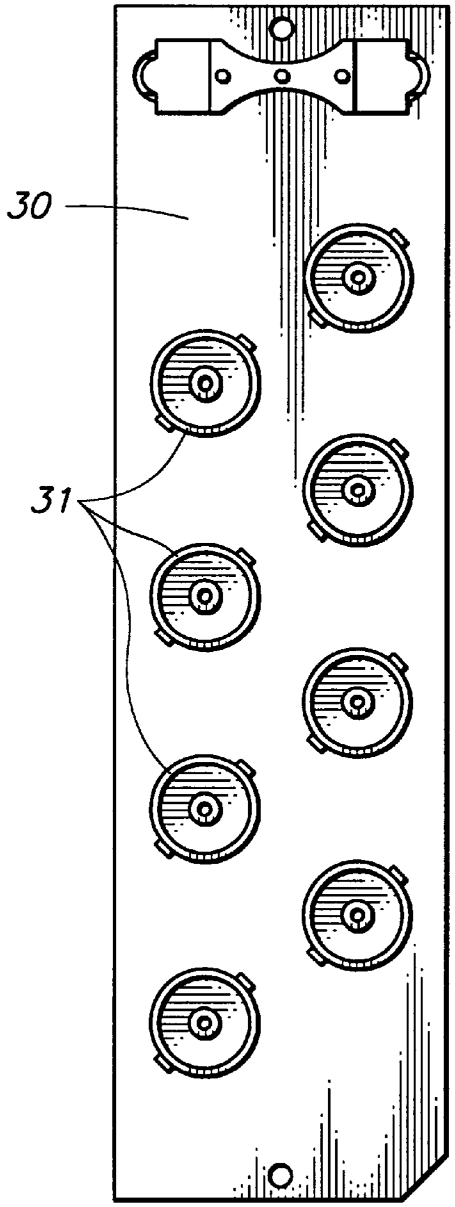
FIG. 4A is a rear view of a prior art circuit board configuration with traditional BNC type electrical connectors mounted thereon.
Figure 4B:
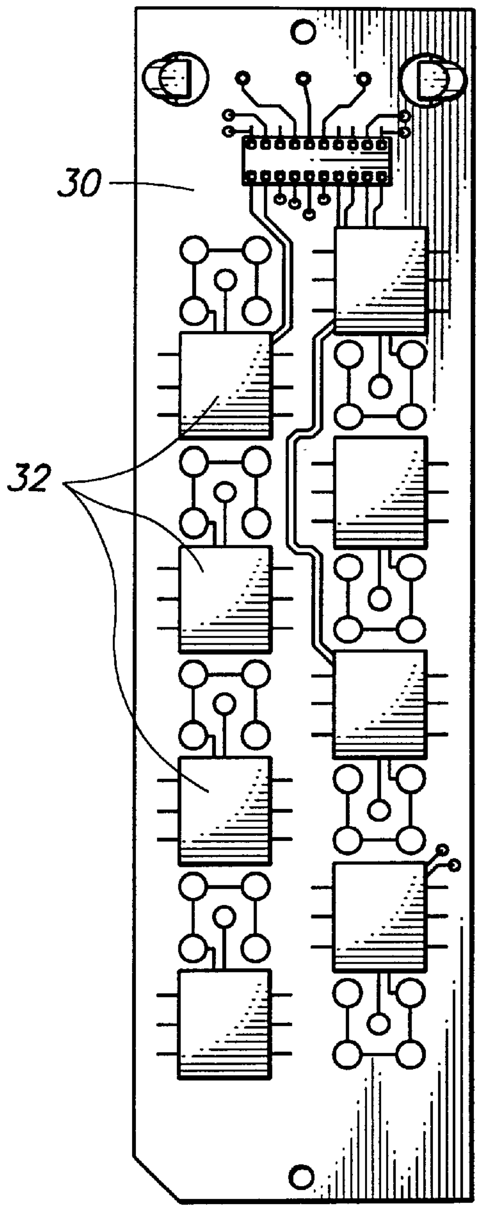
FIG. 4B is a front view of circuit board with multiple transformers mounted thereon and electrically connected to the BNC type electrical connectors.

FIG. 4A is a rear view of a prior art circuit board 30 configuration with traditional BNC type electrical connectors 31 mounted thereon, and FIG. 4B is a front view of circuit board 30 with multiple transformers 32 mounted thereon and electrically connected to the BNC type electrical connectors 31. This invention mounts a transformer in each electrical connector 31 and thereby eliminates the need to separately mount and electrically connect the transformers 32 shown in FIG. 4B to the circuit board 30 (as must be done in the prior art shown in FIGS. 4A & 4B. The specifications and typical components of the BNC and TNC connectors are known in the industry and will not therefore be discussed in great detail herein.

Figure 5:
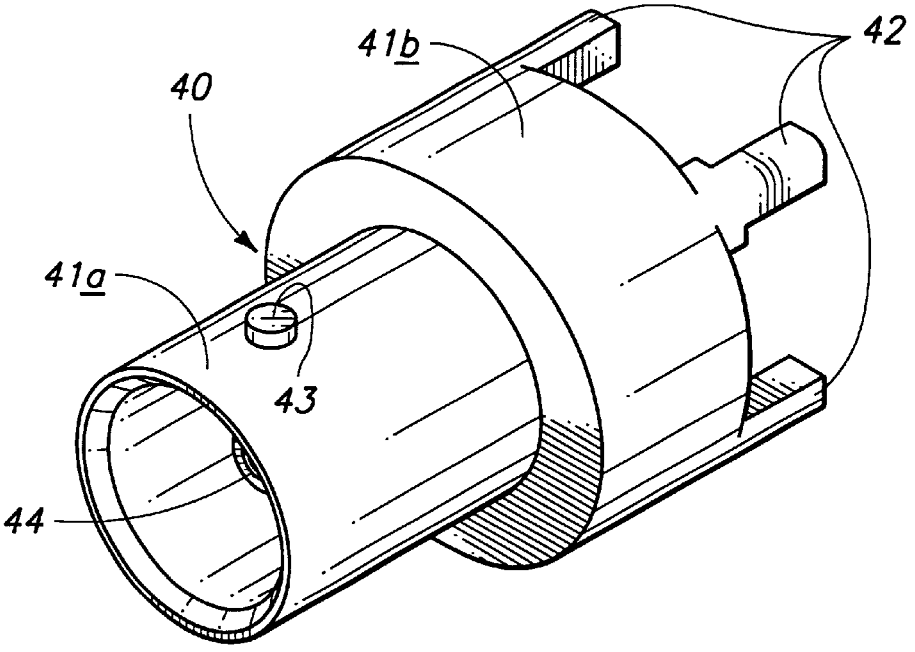
FIG. 5 is a front perspective view of a female BNC type electrical connector.

FIG. 5 is a front perspective view of a female BNC type electrical connector assembly 40. Electrical connector assembly 40 includes housing 41, with both a connector portion 41*a* and with a mount structure portion 41*b*. The connector portion 41*a* of the housing 41 includes engagement pin 43 which extends radially outward from the sleeve or connector portion 41*a*, adapted to engage and interact with slots in the male BNC electrical connector, all of which is well known in the industry. Also shown is female receptacle contact 44 within the connector portion 41*a* of the housing 41. The female receptacle contact 44 is adapted within the housing 41 to engage the male BNC center terminal of a male BNC electrical connector, as is standard and known in the industry.

The mount structure portion 41*b* of housing 41 includes an internal cavity which receives and houses the transformer and other components of the electrical connector assembly 40. The mount structure portion 41*b* further includes mount legs 42 which may be inserted through apertures in the circuit board and thereby soldered or otherwise attached to the circuit board, as further disclosed later with reference to FIG. 9.

Figure 6:
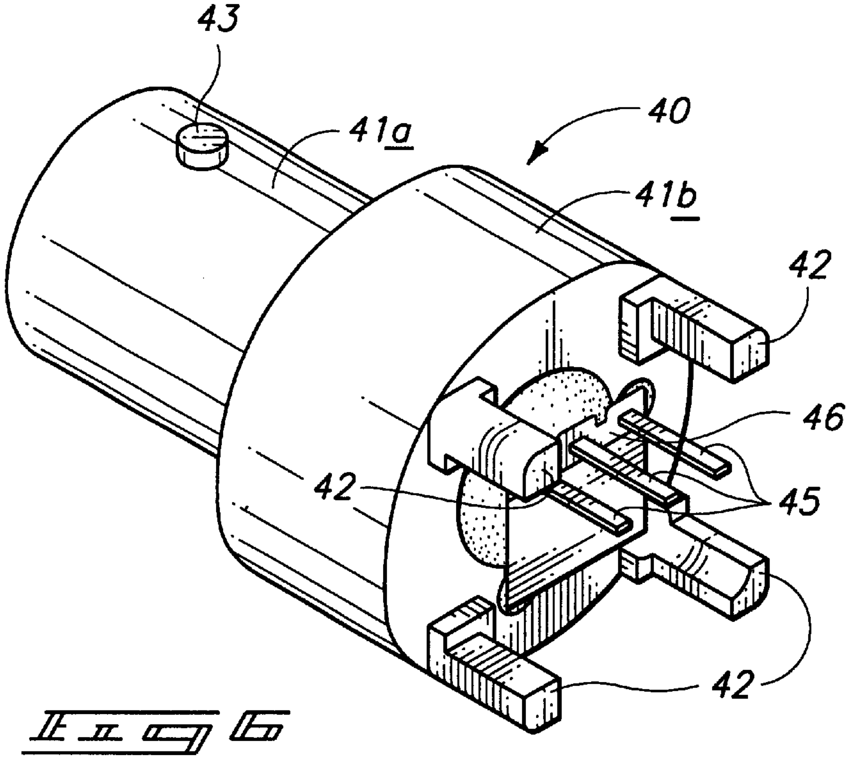
FIG. 6 is a rear perspective view of an embodiment of a BNC type electrical connector contemplated by this invention.

FIG. 6 is a rear perspective view of a BNC type electrical connector assembly 40 contemplated by an embodiment of this invention, illustrating the housing 41, the connector portion 41*a* of the housing 41, engagement pin 43, the mount structure portion 41*b* of housing 41, and mount legs 42.

FIG. 6 also illustrates electrical contacts 45 extending from transformer 46. Electrical contacts 45 are disposed and adapted to be connected to traces on the printed circuit board to which the electrical connector assembly 40 is mounted.

Figures 7, 8:
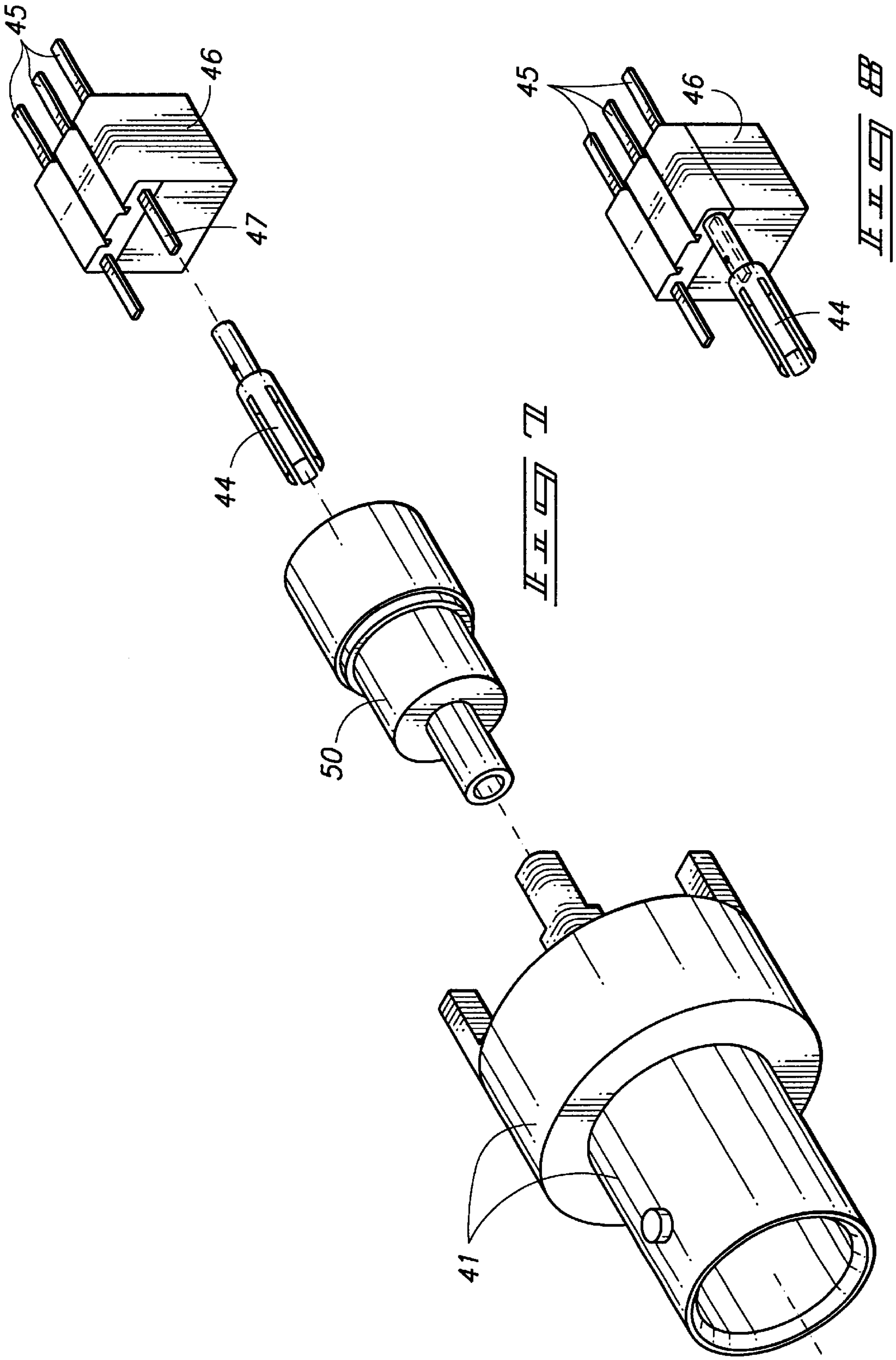
FIG. 7 is a front perspective exploded view of an embodiment of the electrical connector as shown in FIG. 6.
FIG. 8 is a perspective view of a transformer mounted within female receptacle contact, as contemplated by an embodiment of this invention.

FIG. 7 is a front perspective, exploded view of the electrical connector assembly 40 as shown in FIG. 6, showing electrical connector housing 41, insulator 50, female receptacle contact 44 which inserts into insulator 50, and transformer 46. Transformer 46 may be a transformer such as that available through Midcom as part number 50622, and includes electrical contacts 45 for electrically connecting the electrical connector to the circuit board and transformer output 47 which is inserted and mounted into female receptacle contact 44.

FIG. 8 is a perspective view of transformer 46 mounted within female receptacle contact 44. Transformer output 47 is inserted within the female receptacle contact 44, and electrical contacts 45 are also shown.

Figure 9:
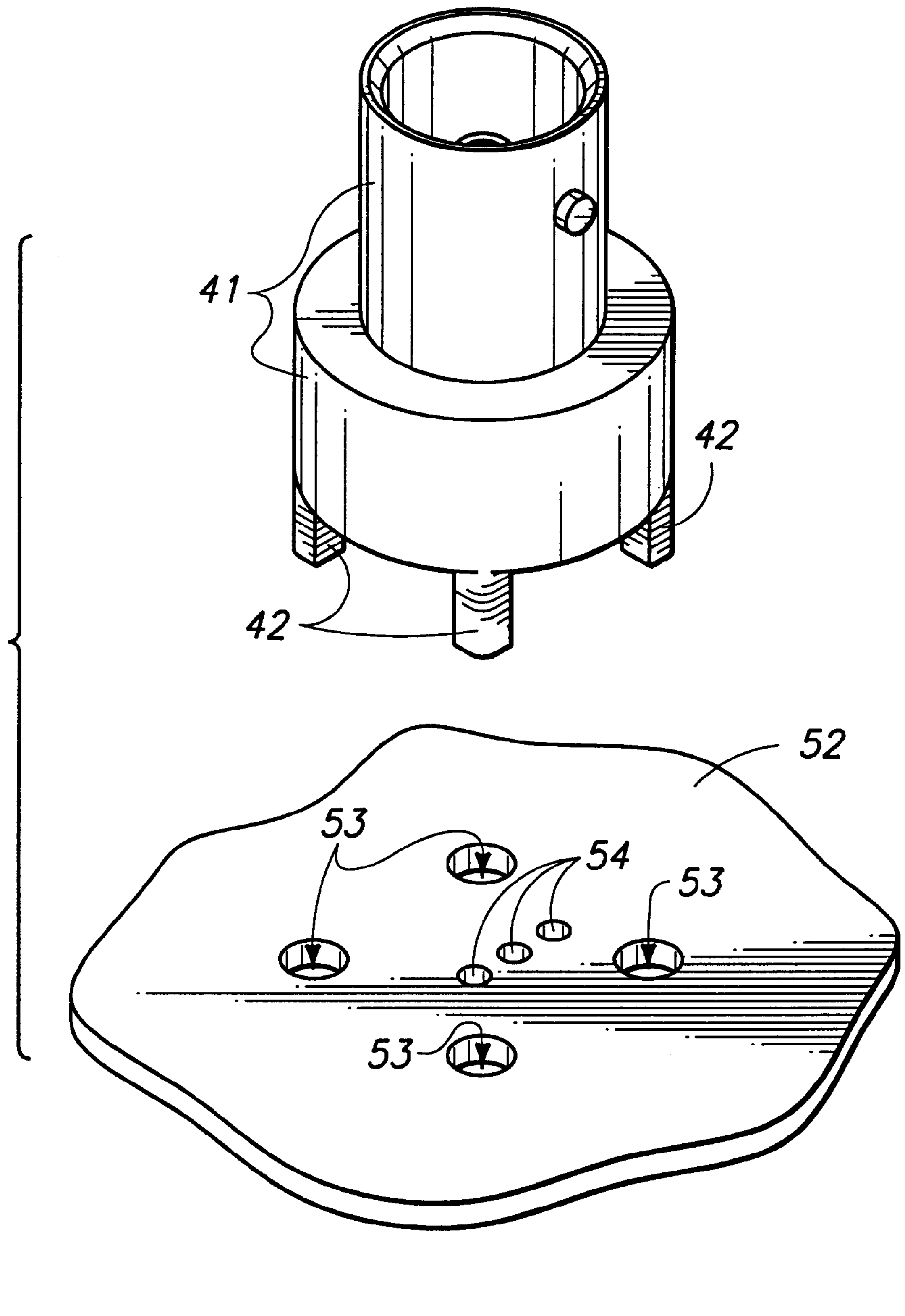
FIG. 9 is a front perspective view of an embodiment of a BNC type electrical connector contemplated by this invention.

FIG. 9 is a front perspective of a BNC type electrical connector assembly 40 embodiment of this invention, illustrating circuit board 52 with electrical contact apertures 54 in the circuit board through which electrical contacts 45 are inserted and which may be soldered to the other side of the circuit board. Circuit board 52 also includes mount leg apertures 53, through which mount legs 42 are inserted and which may also soldered to the other side of the circuit board 52.

Figure 10:
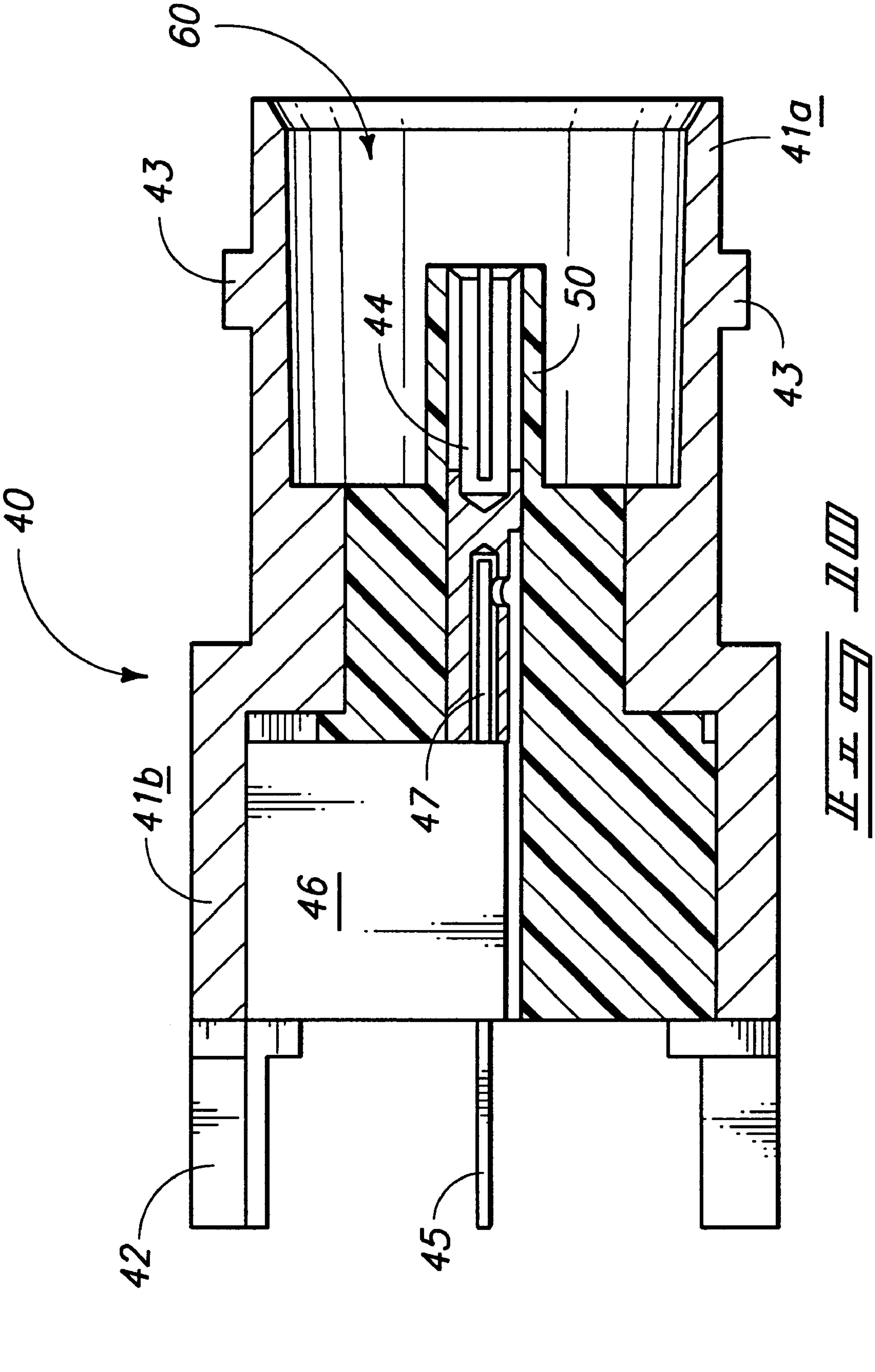
FIG. 10 is a side cross-sectional view of one embodiment of a BNC type electrical connector contemplated by this invention.

FIG. 10 is a side cross-sectional view of one embodiment of a BNC type electrical connector assembly 40 contemplated by this invention, illustrating electrical contacts 45, mount legs 42, transformer 46, connector portion 41*a*, mount structure portion 41*b*, female receptacle contact 44, insulator 50, engagement pins 43, and the open interior chamber of the electrical connector assembly 40. Transformer output 47 is shown inserted within female receptacle contact 44.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the Doctrine of Equivalents.

I claim:

1. A telecommunication network digital cross-connect jack and electrical connector assembly, comprising:

a. a framework having a front panel which includes at least one input sleeve and at least one output sleeve for receiving plugs therein;

b. at least one input switch assembly mounted in the framework and adapted to receive and make electrical contact with a plug inserted in the at least one input sleeve;

c. at least one output switch assembly mounted in the framework and adapted to receive and make electrical contact with a plug inserted in the at least one output sleeve;

d. an input connector assembly electrically connected to the at least one input switch assembly;

e. an output connector assembly electrically connected to the at least one output switch assembly;

and wherein the output connector assembly and the input connector assembly are each comprised of:

i. a connector assembly housing which includes a mating housing portion which is adapted to receive a corresponding mating electrical connector housing;

ii. an electrical insulator mounted within the connector assembly housing, the electrical insulator including an internal aperture;

iii. an electrical contact member mounted within the internal aperture of the electrical insulator, and adapted at a first end to make electrical contact with an electrical contact member of a mating electrical connector housing; and iv. a transformer mounted within the connector assembly housing, with a first side electrically connected to the electrical contact member and with a second side providing transformer input contacts for receiving an electrical signal from the corresponding switch assembly.

2. A digital cross-connect jack assembly as recited in claim 1, and in which the electrical connector assemblies are BNC type connector assemblies.

3. A digital cross-connect jack assembly as recited in claim 1, and in which the electrical connector assemblies are TNC type connector assemblies.

4. A digital cross-connect jack assembly as recited in claim 1, and in which the electrical connector assemblies are 1.6/5.6 type connector assemblies.

5. A telecommunication network digital cross-connect jack and electrical connector assembly, comprising:

a. a framework having a front panel which includes at least one input sleeve and at least one output sleeve for receiving plugs therein;

b. at least one input switch assembly mounted in the framework and adapted to receive and make electrical contact with a plug inserted in the at least one input sleeve, and electrically connected to a printed circuit board;

c. at least one output switch assembly mounted in the framework and adapted to receive and make electrical contact with a plug inserted in the at least one output sleeve, and electrically connected to the printed circuit board;

d. an input connector assembly mounted on the printed circuit board;

e. an output connector assembly mounted on the printed circuit board;

and wherein the output connector assembly and the input connector assembly are each comprised of:

i. a connector assembly housing comprised of a mating housing portion which is adapted to receive a corresponding mating electrical connector housing, and at least one mount leg disposed to be inserted in and mounted to the printed circuit board;

ii. an electrical insulator mounted within the connector assembly housing, the electrical insulator including an internal aperture;

iii. an electrical contact member mounted within the internal aperture of the electrical insulator, and adapted at a first end to make electrical contact with an electrical contact member of a mating electrical connector housing; and iv. a transformer mounted within the connector assembly housing, with a first side electrically connected to the electrical contact member and with a second side providing transformer input contacts electrically connected to the printed circuit board to receive electrical signals from the corresponding switch assemblies.

6. A digital cross-connect jack assembly as recited in claim 5, and in which the electrical connector assemblies are BNC type connector assemblies.

7. A digital cross-connect jack assembly as recited in claim 5, and in which the electrical connector assemblies are TNC type connector assemblies.

8. An electrical connector assembly comprised of:

a. a connector assembly housing which includes a mating housing portion which is adapted to receive a corresponding mating electrical connector housing;

b. an electrical insulator mounted within the connector assembly housing, the electrical insulator including an internal aperture;

c. an electrical contact member mounted within the internal aperture of the electrical insulator, and adapted at a first end to make electrical contact with an electrical contact member of a mating electrical connector housing; and d. a transformer mounted within the connector assembly housing, with a first side electrically connected to the electrical contact member and with a second side providing transformer input contacts for receiving an electrical signal from the corresponding switch assembly.

9. An electrical connector assembly as recited in claim 8, and wherein the electrical connector assembly is a BNC type connector assembly.

10. An electrical connector assembly as recited in claim 8, and wherein the electrical connector assembly is a TNC type connector assembly.

* * * * *